(12) United States Patent
Ouyang et al.

(10) Patent No.: US 10,036,905 B2
(45) Date of Patent: Jul. 31, 2018

(54) COMPACT SIX-PORT PHOTONIC CRYSTAL CIRCULATOR

(71) Applicant: SHENZHEN UNIVERSITY, Shenzhen (CN)

(72) Inventors: Zhengbiao Ouyang, Shenzhen (CN); Qiong Wang, Shenzhen (CN)

(73) Assignee: Shenzhen University, Shenzhen, Guangdong (CN)

( * ) Notice: Subject to any disclaimer, the term of this patent is extended or adjusted under 35 U.S.C. 154(b) by 0 days.

(21) Appl. No.: 15/515,591

(22) PCT Filed: Sep. 28, 2015

(86) PCT No.: PCT/CN2015/090869
§ 371 (c)(1),
(2) Date: Mar. 29, 2017

(87) PCT Pub. No.: WO2016/050178
PCT Pub. Date: Apr. 7, 2016

(65) Prior Publication Data
US 2017/0322433 A1    Nov. 9, 2017

(30) Foreign Application Priority Data
Sep. 29, 2014    (CN) .......................... 2014 1 0515362

(51) Int. Cl.
*G02B 6/12*    (2006.01)
*G02F 1/095*    (2006.01)
(Continued)

(52) U.S. Cl.
CPC .......... *G02F 1/0955* (2013.01); *G02B 1/005* (2013.01); *G02B 6/1225* (2013.01); *G02B 2006/12157* (2013.01); *G02F 2202/32* (2013.01)

(58) Field of Classification Search
None
See application file for complete search history.

(56) References Cited

U.S. PATENT DOCUMENTS 7,489,846 B2 * 2/2009 Grot ..................... G02B 6/1225
                                                        385/123
8,693,823 B2 * 4/2014 Ouyang ................. B82Y 20/00
                                                        385/147

(Continued)

*Primary Examiner* — Tina Wong
(74) *Attorney, Agent, or Firm* — Li-Jen Shen

(57) ABSTRACT

A compact six-port Photonic Crystal (PhC) circulator includes a hexagonal PhC branch waveguide and six waveguide ports, wherein six PhC branch waveguides respectively correspond to the six waveguide ports, and the six waveguide ports respectively are symmetrically distributed at the periphery of PhCs. One second dielectric material column is arranged at the center of the hexagonal PhC waveguide. Six identical magneto-optical material columns respectively are arranged at first adjacent positions of the second dielectric material column. Six identical third dielectric material columns respectively are arranged at second adjacent positions of the second dielectric material column. An electromagnetic signal is inputted from any one of the waveguide ports and is outputted from the next waveguide port adjacent thereto, while the remaining waveguide ports are in a signal isolated state, thus forming unidirectional circular transmission.

20 Claims, 4 Drawing Sheets

(51) Int. Cl.
 *G02B 1/00* (2006.01)
 *G02B 6/122* (2006.01)

(56) References Cited

U.S. PATENT DOCUMENTS 8,731,360 B2 * 5/2014 Ouyang ................ B82Y 20/00
 359/321
9,778,496 B2 * 10/2017 Dmitriev ................ G02F 1/095

* cited by examiner

COMPACT SIX-PORT PHOTONIC CRYSTAL CIRCULATOR

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a photonic crystal (PhC) magneto-optical device and circulator, and more particularly to a six-port PhC magneto-optical circulator with a high efficiency of transmission and a high degree of isolation.

Description of Related Arts

The magneto-optical circulator can realize circular transmission of optical signals in single rotational direction in channels by utilizing the nonreciprocal characteristic of magneto-optical materials, so as to achieve the aims of preventing the signal reflection, eliminating the signal crosstalk and guaranteeing the normal operation of an optical circuit system. Therefore, magnetic-optical circulator is an essential device for reducing the optical signal crosstalk in integrated optical circuits.

On the other hand, in recent years, the research field for PhC optical devices becomes hot. PhC is a new artificial material and has a dielectric constant or magnetic permeability which has a periodic or quasi-periodic arrangement in space. Its photonic bandgap effect can ensure waves not to propagate in certain frequency bands. By introducing defects in PhCs to achieve the guidance and control of photons, various functions of optical devices are able to be obtained accordingly, such as PhC lasers, filters, optical switches, and WDM devices. As technology continues to develop, not only it stays in the study of simple-function PhC devices, but also more attention is paid to research on integrated circuits consisting of a number of different PhC logical devices, so that a PhC CPU (central processing unit) may be created in the near future.

With the increase of the integration scale of PhC devices, mutual interference between devices become more apparent. If the interference signal cannot be effectively eliminated or inhibited, the overall performance and integration will be affected greatly. Therefore, optimizing the optical circuit performance of the magneto-optical circulator is crucial. For PhC magnetic-optical circulator, there have been created three-port, and four-port structures, but PhC circulators with more than four-port are rare. Especially, PhC circulators with multiple-ports based on air-substrate-dielectric-column structure have not been reported. The PhC with an air-substrate-dielectric-column structure has a wide band and a simple and concise structure, and is easy to manufacture, that has important applications in the study of the magneto-optical circulators.

SUMMARY OF THE PRESENT INVENTION

The invention is advantageous in that it provides a six-port PhC magneto-optical circulator to overcome the deficiencies of the prior art, which has a compact structure and is easy to manufacture and be integrated, thus forming a high efficiency and high isolation unidirectional circular transmission of electromagnetic signals among six ports.

Additional advantages and features of the invention will become apparent from the description which follows, and may be realized by means of the instrumentalities and combinations particular point out in the appended claims.

According to the present invention, the foregoing and other objects and advantages are attained by a six-port PhC magneto-optical circulator. A main body of a PhC circulator of the present invention is a two-dimensional hexagonal PhC waveguide in a low refractive index background material. The hexagonal PhC waveguide comprises two-dimensional first dielectric material columns which are arranged in forms of triangular lattices. The six hexagonal PhC branch waveguides are arranged at a cross-connected position in the center and have a 60° rotational symmetry distribution. The compact-type six-port PhC circulator comprises a hexagonal PhC branch waveguide and six waveguide ports, wherein six PhC branch waveguides correspond to the six waveguide ports respectively, and the six waveguide ports respectively are symmetrically distributed at the periphery of PhCs. One second dielectric material column is arranged at the center of the hexagonal PhC waveguide. Six identical magneto-optical material columns respectively are arranged at first adjacent positions of the second dielectric material column. Six identical third dielectric material columns respectively are arranged at second adjacent positions of the second dielectric material column. An electromagnetic signal is inputted from any one of the waveguide ports and is outputted from the next waveguide port adjacent thereto, while the remaining waveguide ports are placed in a signal isolated state, thus forming unidirectional circular transmission.

The low refractive index background material is a dielectric material having a refractive index of less than 1.5.

The low refractive index background material is selected from the group consisting of air, vacuum and foam.

The material of the first dielectric material columns is a dielectric material having a refractive index of more than 2, wherein a shape of cross-section of the first dielectric material columns is selected from the group consisting of circular and regular polygon, wherein the shape of the cross-section of the first dielectric material columns preferably is circular.

A material of the first dielectric material columns is selected from the group consisting of silicon, gallium arsenide, titanium dioxide, and gallium nitride The central axis of the six branch waveguides respectively are located along a negative direction with respect to a horizontal axis, in an angle of 240° with respect to the horizontal axis, in an angle of 300° with respect to the horizontal axis, in a positive direction with respect to the horizontal axis, in an angle of 60° with respect to the horizontal axis and in an angle of 120° with respect to the horizontal axis.

The width of each of the branch waveguides is 3a and the length of each branch waveguide is na, wherein "a" is lattice constant of the PhC and "n" is an integer no less than 4.

The material of the second dielectric material column is a dielectric material having a refractive index of more than 2, wherein a shape of cross-section of the second dielectric material column is selected from the group consisting of regular hexagon and circular, wherein the shape of the cross-section of the second dielectric material column preferably is regular hexagon and the each vertex of the regular hexagon is located on the center axis of the corresponding branch waveguide.

The material of the second dielectric material column is selected from the group consisting of silicon, gallium arsenide, titanium dioxide, and gallium nitride.

A distance between the center of the second dielectric material column and the center of each of the six magneto-optical material columns is 1.8a, where "a" is lattice constant of the PhC.

Ferrite material is selected for the magneto-optical material columns and a shape of the cross-sections of the magneto-optical material columns is selected from the group consisting of circular and regular polygon, wherein the shape of the cross-sections of the magneto-optical material columns preferably is circular.

A material of the third dielectric material columns a dielectric material having a refractive index of more than 2, wherein a shape of cross-section of the third dielectric material columns is selected from the group consisting of equilateral triangle and circular, wherein the shape of the cross-section of the second dielectric material column preferably is equilateral triangle and the center point and a vertex of the equilateral triangle are located on the center axis of the corresponding branch waveguide and the vertex of the equilateral triangle corresponds to the waveguide port direction.

A material of the third dielectric material columns is selected from the group consisting of silicon, gallium arsenide, titanium dioxide, and gallium nitride.

A distance between each of the centers of the third dielectric material columns and the center of the second dielectric material column is 3.2a and "a" is lattice constant of the PhC.

The six-port PhC circulator of the present invention is applicable to any electromagnetic wave band such as the microwave band, the millimeter wave band, the terahertz wave band, the infrared wave band, and the visible light wave band. Compared with the prior art, it has the following advantages:

Firstly, the six-port PhC circulator with the air-substrate-dielectric-column structure is applicable to PhC system with complex structure and functional integration. The six-port PhC circulator has an inestimable effect on enhancing optical anti-interference and stability and other aspects and is an essential foundational element for large scale integrated optical circuit based on photonic crystals.

Secondly, the use of magneto-optical material columns in cyclic annular connection and the manner of arranging compensation columns on the periphery of the magneto-optical material form a unidirectional circular transmission with a high efficiency and a high optical isolation of electromagnetic wave signal among the six ports.

Thirdly, not only the six-port PhC circulator has a high symmetry, a compact structure and an excellent performance, but also the six-port PhC circulator has a wide operating frequency, easy to manufacture and easy to achieve integration with other PhC device.

Fourthly, the six-port PhC circulator simultaneously guide or isolates backward signal and interference between multiple elements, while the six-port PhC circulator simultaneously provides functions of eliminating signal crosstalk among multiple elements of PhC integrated optical circuits based on PhC.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
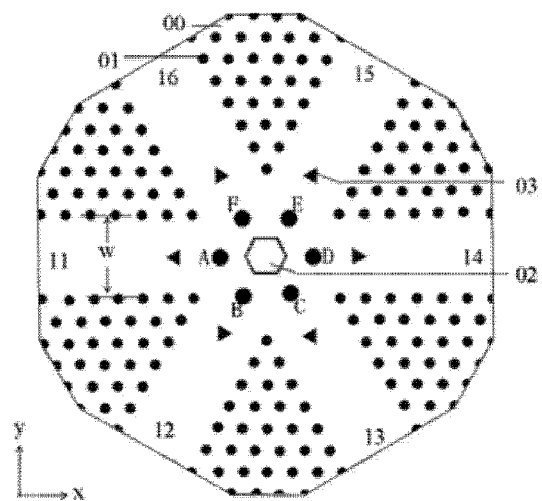
FIG. 1 is a structure diagram of a six-port photonic crystal (PhC) magneto-optical circulator according to an embodiment of the present invention, wherein background material 00, first dielectric material columns 01, second dielectric material column 02, third dielectric material columns 03, first waveguide port 11, second waveguide port 12, third waveguide port 13, fourth waveguide port 14, fifth waveguide port 15, sixth waveguide port 16, magneto-optical material column A, magneto-optical material column B, magneto-optical material column C, magneto-optical material column D, magneto-optical material column E, magneto-optical material column F, waveguide width w.

As shown in FIG. 1, a main body of a photonic crystal (PhC) circulator of the present invention is a two-dimensional hexagonal PhC waveguide in a low refractive index background material 00. The hexagonal PhC waveguide comprises two-dimensional first dielectric material columns 01 which are arranged in the forms of triangular lattices. The material of the low refractive index background material 00 is air. The hexagonal PhC waveguide comprises six branch waveguides which are arranged at a cross-connected position in the center and have a 60° rotational symmetry distribution. The central axis of the six branch waveguides are located respectively along a negative direction with respect to the horizontal axis, in an angle of 240° with respect to the horizontal axis, and in an angle of 300° with respect to the horizontal axis, in a positive direction with respect to the horizontal axis, in an angle of 60° with respect to the horizontal axis, and in an angle of 120° with respect to the horizontal axis. A width of each of the branch waveguides is 3a and a length of each of the branch waveguides is na, wherein "a" is selected as the lattice constant of the PhC and "n" is an integer greater than or equal to 4. The first dielectric material columns 01 which are arranged in the forms of triangular lattices are filled between each two adjacent branch waveguides of the six branch waveguides. The lattice constant a of the triangular lattices array is set to 10 mm; the cross-section of the first dielectric material columns 01 is circular or regular polygon. The cross-section of the first dielectric material columns 01 is preferably a circular with 2.2 mm radius. The cross-section of the first dielectric material columns 01 is in x-y plane. The cylinder axis is along a z-axis direction; the first dielectric material columns 01 is made of silicon material and has a refractive index of 3.4. The circulator of the present invention comprises a hexagonal PhC branch waveguide and six waveguide ports. The hexagonal PhC branch waveguide is six branch waveguides which are cross-connected in a center position of the PhC and have a 60° rotational symmetry distribution. The six PhC branch waveguides respectively correspond to a first waveguide port 11, a second waveguide port 12, a third waveguide port 13, a fourth waveguide port 14, a fifth waveguide port 15 and a sixth waveguide port 16. The six waveguide ports respectively are symmetrically distributed at the periphery of PhCs.

In the intersection of the center axis of the six PhC branch waveguides, which is the center position of the PhC, a second dielectric material column 02 serving as a guide is arranged. The cross-section of the second dielectric material column 02 is a regular hexagon, and the each of the six vertex of the regular hexagon respectively is located on the center axis of the corresponding six branch waveguides. The second dielectric material column 02 is made of silicon material and has a refractive index of 3.4.

In the periphery of the second dielectric material column 02, where locates the first adjacent positions respectively along the center axis of the six branch waveguides, which is respectively along a negative direction with respect to the horizontal axis, in an angle of 240° with respect to the horizontal axis, and in an angle of 300° with respect to the horizontal axis, in a positive direction with respect to the horizontal axis, in an angle of 60° with respect to the horizontal axis and in an angle of 120° with respect to the horizontal axis. In these first adjacent positions, six identical magneto-optical material columns A, B, C, D, E and F are arranged, wherein a distance between each of the magneto-optical material columns and the center of the second dielectric material column 02 is 1.8a which is 18 mm.

Ferrite material is selected as the material for the magneto-optical material columns A, B, C, D, E and F, and the cross-sections of the magneto-optical material columns A, B, C, D, E and F respectively are circular, wherein the dielectric constant is 12.9 and the permeability tensor of the material is:

$$[\mu] = \mu_0 \begin{bmatrix} \mu_y & jx & 0 \\ -jx & \mu_y & 0 \\ 0 & 0 & 1 \end{bmatrix}$$

Wherein $\kappa=\omega_m\omega)/(\omega_0^2-\omega^2)$, $\mu_r=1+\kappa\omega_0/\omega$, $\omega_0=\mu_0\gamma H_0$, $\omega_m=\mu_0\gamma M_s$, $\gamma=1.759\times10^{11}$C/kg, $M_s=2.39\times10^5$ A/m. And, the external magnetic field applied to the magneto-optical material columns A, B, C, D, E and F is $H_0=3.45\times10^5$ A/m. In order to match each of the magneto-optical material columns to the corresponding waveguide, in the periphery of each of the magneto-optical material columns, i.e., in the periphery of the second dielectric material column 02, which is in the second adjacent position, wherein six identical compensation columns are arranged respectively along the center axis of the six PhC waveguides. The six identical compensation columns are defined as third dielectric material columns 03. The silicon material is selected as the material for the third dielectric material columns 03. The third dielectric material columns 03 have a refractive index of 3.4. The cross-sections of the third dielectric material columns 03 are equilateral triangle. The center point of the equilateral triangle and a vertex thereof are located in the center axis of the corresponding branch waveguide. The vertex of the equilateral triangle corresponds to the waveguide port direction. A distance between each of the centers of the third dielectric material columns 03 and the center of the second dielectric material column 02 is 3.2a which is 32 mm.

Figure 2:
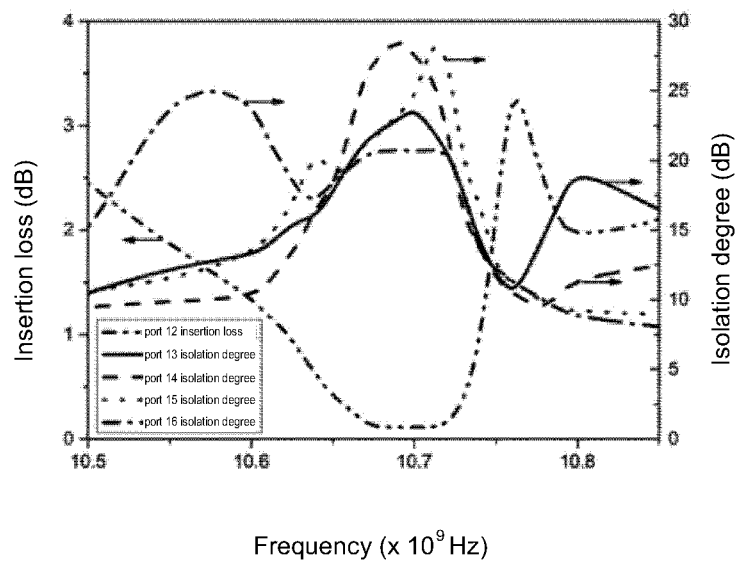
FIG. 2 is a spectrogram of a six-port PhC magneto-optical circulator according to an embodiment of the present invention.

Further, the structure parameters of the circulator are optimized. an electromagnetic signal is inputted from the first waveguide port 11 and is outputted from the second waveguide port 12, and the remaining waveguide ports are signal isolation ports. Signal line detectors are respectively arranged on the second waveguide port 12 to the sixth waveguide port 16 to obtain the electromagnetic power transmitted to the corresponding ports. The insertion loss of the second waveguide port 12 is 10 log ($P_{input}/P_{output}$) and the isolation degrees of the third waveguide port 13, the fourth waveguide port 14, the fifth waveguide port 15, and that the sixth waveguide port 16 respectively are 10 log ($P_{input}/P_{isolation\ 3}$), 10 log ($P_{input}/P_{isolation\ 4}$), 10 log ($P_{input}/P_{isolation\ 5}$) and 10 log ($P_{input}/P_{isolation\ 6}$), wherein the $P_{input}$ is the signal power of the first waveguide port 11 which is the signal input port, wherein the $P_{output}$ is the signal power of the second waveguide port 12 which is the signal output port; the $P_{isolation\ 3}$, $P_{isolation\ 4}$, $P_{isolation\ 5}$ and the $P_{isolation\ 6}$ are the signal power of the third waveguide port 13, the fourth waveguide port 14, the fifth waveguide port 15, and the sixth waveguide port 16 which are the signal isolation ports. By optimizing the side length of the regular hexagon of the second dielectric material column 02 into 8.7 mm, the side length of the equilateral triangle of the third dielectric material columns 03 into 2.0 mm, the column radius of the magneto-optical materials A, B, C, D, E and F into 3.7 mm, the best insertion loss and isolation calculation curves of the six-port PhC magneto-optical circulator are obtained, as shown in FIG. 2 of the drawings. As shown in FIG. 2 of the drawings, the dash-point curve represents the insertion loss of the second waveguide port 12 at different frequency; the solid curve, the dashed curve, the all-point curve and the dash-point curve respectively represent the isolation degrees of the third waveguide port 13, the fourth waveguide port 14, the fifth waveguide port 15 and the sixth waveguide port 16 at different frequency, in this case, the electromagnetic signal is incident from the first waveguide port 11, wherein the dash-point curve corresponds to the isolation degree of the second waveguide port 12, wherein the solid curve corresponds to the isolation degree of the third waveguide port 13, wherein the dashed curve corresponds to the isolation degree of the fourth waveguide port 14, wherein the points curves corresponds to the isolation degree of the fifth waveguide port 15, wherein the dashed-single-point curve corresponds to the isolation degree of the sixth waveguide port 16. As shown in FIG. 2 of the drawings, the operating frequency range of the PhC circulator is 10.68 GHz to 10.72 GHz, wherein the insertion loss of the second waveguide port 12 within the frequency range is less than 0.12 dB, wherein the isolation degree of the third waveguide port 13 within the frequency range is greater than 21 dB. The isolation degree of the fourth waveguide port 14 within the frequency range is greater than 26 dB. The isolation degree of the fifth waveguide port 15 within the frequency range is greater than 22 dB. The isolation degree of the sixth waveguide port 16 within the frequency range is greater than 20 dB.

Due to the rotational symmetry of the structure, the above optimized structure parameters are also applicable to the cases of the electromagnetic signals incident from other waveguide ports and the results of the obtained insertion loss and isolation degree of the circulator and the calculated curve are the same as the results as shown in FIG. 2 of the drawings.

Figure 3:
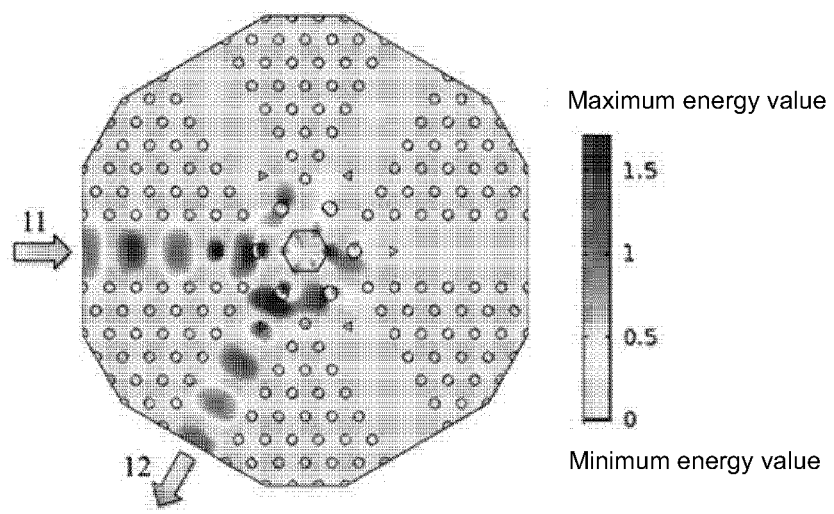
FIG. 3 is a first-case light transmission diagram of a six-port PhC magneto-optical circulator according to an embodiment of the present invention.

The operating performance of the six-port PhC circulator is tested according to the above optimized results:

Referring to FIG. 3 of the drawings, the frequency of the electromagnetic wave is chosen to be within 10.68 GHz to 10.72 GHz. For example, an electromagnetic wave with the frequency of 10.72 GHz is incident from the first waveguide port 11, wherein the electromagnetic wave is rotated by the angle of 60° by the magneto-optical material columns A and B successively. And finally the electromagnetic wave is outputted from the second waveguide port 12 and the insertion loss of the second waveguide port 12 is 0.112 dB. Wherein the second dielectric material column 02 of the PhC causes an efficient coupling between the magneto-optical material columns A and B. The third dielectric material columns 03 on the periphery of the magneto-optical material column A has an effect of improving match between of the magneto-optical material column A and the corresponding waveguide thereof. The third dielectric material columns 03 on the periphery of the magneto-optical material column B has an effect on improving match between the magneto-optical material column B and the corresponding waveguide thereof; therefore the transmission efficiency from the first waveguide port 11 to the second waveguide port 12 is improved. The third waveguide port 13, the fourth waveguide port 14, the fifth waveguide port 15 and the sixth waveguide port 16 are in the light isolation state and the isolation degrees respectively are 23.78 dB, 27.42 dB, 24.17 dB and 20.69 dB. In this case, the magneto-optical material column C has an effect of isolating the third waveguide port 13. The magneto-optical material column D has an effect of isolating the fourth waveguide port 14. The magneto-optical material column E has an effect of isolating the fifth waveguide port 15. The magneto-optical material column F has an effect of isolating the sixth waveguide port 16.

Figure 4:
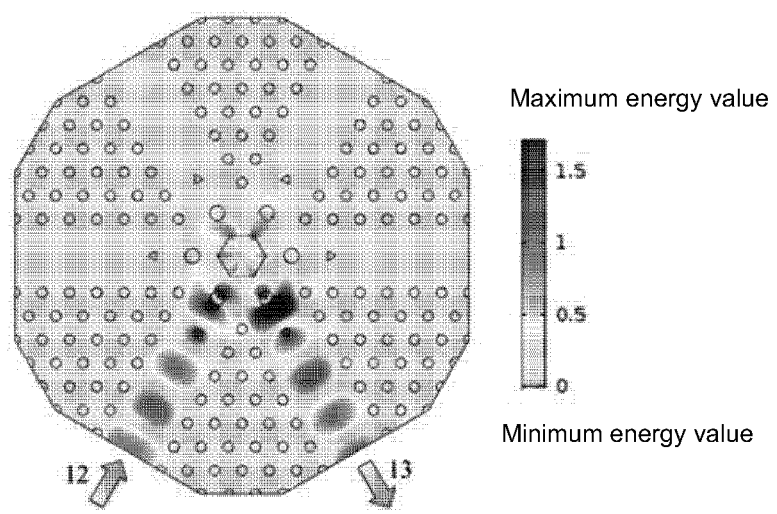
FIG. 4 is a second-case light transmission diagram of a six-port PhC magneto-optical circulator according to an embodiment of the present invention.

Referring to FIG. 4 of the drawings, the frequency of the electromagnetic wave is chosen to within 10.68 GHz to 10.72 GHz. For example, the electromagnetic wave with the frequency of 10.70 GHz is incident from the second waveguide port 12; the electromagnetic wave is rotated by the angle of 60° by the magneto-optical material column B and C successively; and finally the electromagnetic wave is outputted from the third waveguide port 13 and the insertion loss of the third waveguide port 13 is 0.112 dB. In this case, the second dielectric material column 02 of the PhC causes an efficient coupling of the magneto-optical material columns B and C. The third dielectric material columns 03 on the periphery of the magneto-optical material column B has an effect of improving match between the magneto-optical material column B and the corresponding waveguide thereof. The third dielectric material columns 03 on the periphery of the magneto-optical material column C has an effect of improving match between the magneto-optical material column C and the corresponding waveguide thereof; therefore the transmission efficiency from the second waveguide port 12 to the third waveguide port 13 is improved. The fourth waveguide port 14, the fifth waveguide port 15, the sixth waveguide port 16 and the first waveguide port 11 are in the light isolation state and the isolation degrees respectively are 23.78 dB, 27.42 dB, 24.17 dB and 20.69 dB. In this case, the magneto-optical material column D has an effect of isolating the fourth waveguide port 14. The magneto-optical material column E has an effect of isolating the fifth waveguide port 15. The magneto-optical material column F has an effect of isolating the sixth waveguide port 16. The magneto-optical material column A has an effect of isolating the first waveguide port 11.

Figure 5:
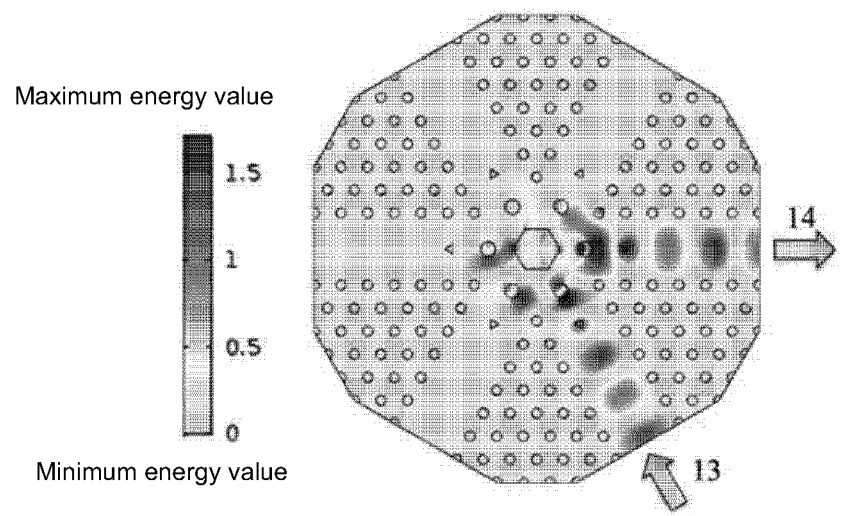
FIG. 5 is a third-case light transmission diagram of a six-port PhC magneto-optical circulator according to an embodiment of the present invention.

Referring to FIG. 5 of the drawings, the frequency of the electromagnetic wave is chosen to within 10.68 GHz to 10.72 GHz. For example, electromagnetic wave with the frequency of 10.70 GHz is incident from the third waveguide port 13. The electromagnetic wave is rotated by the angle of 60° by the magneto-optical material column C and D successively, and finally the electromagnetic wave is outputted from the fourth waveguide port 14 and the insertion loss of the fourth waveguide port 14 is 0.112 dB. In this case, the second dielectric material column 02 of the PhC causes an efficient coupling of the magneto-optical material columns C and D. The third dielectric material columns 03 on the periphery of the magneto-optical material column C has an effect of improving match between the magneto-optical material column C and the corresponding waveguide thereof. The third dielectric material columns 03 on the periphery of the magneto-optical material column D has an effect of improving match between the magneto-optical material column D and the corresponding waveguide thereof, therefore the transmission efficiency from the third waveguide port 13 to the fourth waveguide port 14 is improved. The fifth waveguide port 15, the sixth waveguide port 16, the first waveguide port 11 and the second waveguide port 12 are in the light isolation state and the isolation degrees respectively are 23.78 dB, 27.42 dB, 24.17 dB and 20.69 dB. In this case the magneto-optical material column E has an effect of isolating the fifth waveguide port 15. The magneto-optical material column F has an effect of isolating the sixth waveguide port 16. The magneto-optical material column A has an effect of isolating the first waveguide port 11. The magneto-optical material column B has an effect of isolating the second waveguide port 12.

Figure 6:
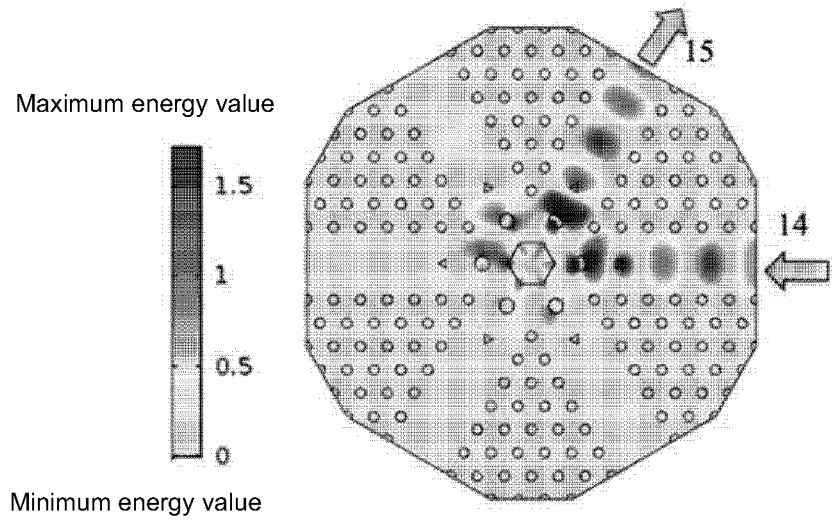
FIG. 6 is a fourth-case light transmission diagram of a six-port PhC magneto-optical circulator according to an embodiment of the present invention.

Referring to FIG. 6 of the drawings, the frequency of the electromagnetic wave is chosen to within 10.68 GHz to 10.72 GHz. For example, electromagnetic wave with the frequency of 10.70 GHz is incident from the fourth waveguide port 14. The electromagnetic wave is rotated by the angle of 60° by the magneto-optical material column D and E successively, and finally the electromagnetic wave is outputted from the fifth waveguide port 15 and the insertion loss of the fifth waveguide port 15 is 0.112 dB. In this case, the second dielectric material column 02 of the PhC causes an efficient coupling of the magneto-optical columns D and E. The third dielectric material columns 03 on the periphery of the magneto-optical material column D has an effect of improving match between the magneto-optical material column D and the corresponding waveguide thereof. The third dielectric material columns 03 on the periphery of the magneto-optical material column E has an effect of improving match between the magneto-optical material column E and the corresponding waveguide thereof, therefore the transmission efficiency from the fourth waveguide port 14 to the fifth waveguide port 15 is improved. The sixth waveguide port 16, the first waveguide port 11, the second waveguide port 12 and the third waveguide port 13 are in the light isolation state and the isolation degrees respectively are 23.78 dB, 27.42 dB, 24.17 dB and 20.69 dB. In this case, the magneto-optical material column F has an effect of isolating the sixth waveguide port 16. The magneto-optical material column A has an effect of isolating the first waveguide port 11. The magneto-optical material column B has an effect of isolating the second waveguide port 12. The magneto-optical material column C has an effect of isolating the third waveguide port 13.

Figure 7:
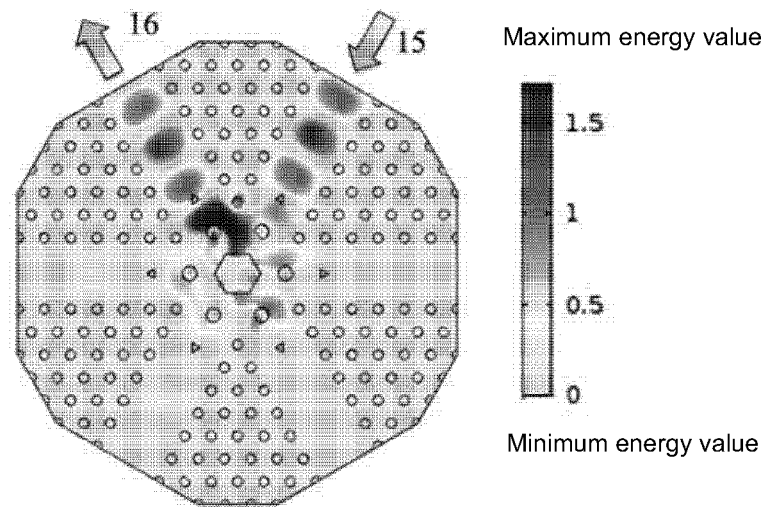
FIG. 7 is a fifth-case light transmission diagram of a six-port PhC magneto-optical circulator according to an embodiment of the present invention.

Referring to FIG. 7 of the drawings, the frequency of the electromagnetic wave is chosen to within 10.68 GHz to 10.72 GHz. For example, electromagnetic wave with the frequency of 10.70 GHz is incident from the fifth waveguide port 15. The electromagnetic wave is rotated by the angle of 60° by the magneto-optical material column E and F successively, and finally the electromagnetic wave is outputted from the sixth waveguide port 16 and the insertion loss of the sixth waveguide port 16 is 0.112 dB. In this case, the second dielectric material column 02 of the PhC causes an efficient coupling of the magneto-optical material columns E and F. The third dielectric material columns 03 on the periphery of the magneto-optical material column E has an effect of improving match between the magneto-optical material column E and the corresponding waveguide thereof. The third dielectric material columns 03 on the periphery of the magneto-optical material column F has an effect of improving match between the magneto-optical material column F and the corresponding waveguide thereof, therefore the transmission efficiency from the fifth waveguide port 15 to the sixth waveguide port 16 is improved. The first waveguide port 11, the second waveguide port 12, the third waveguide port 13 and the fourth waveguide port 14 are in the light isolation state and the isolation degrees respectively are 23.78 dB, 27.42 dB, 24.17 dB and 20.69 dB. In this case, the magneto-optical material column A has an effect of isolating the first waveguide port 11; the magneto-optical material column B has an effect of isolating the second waveguide port 12; the magneto-optical material column C has an effect of isolating the third waveguide port 13. The magneto-optical material column D has an effect of isolating the fourth waveguide port 14.

Figure 8:
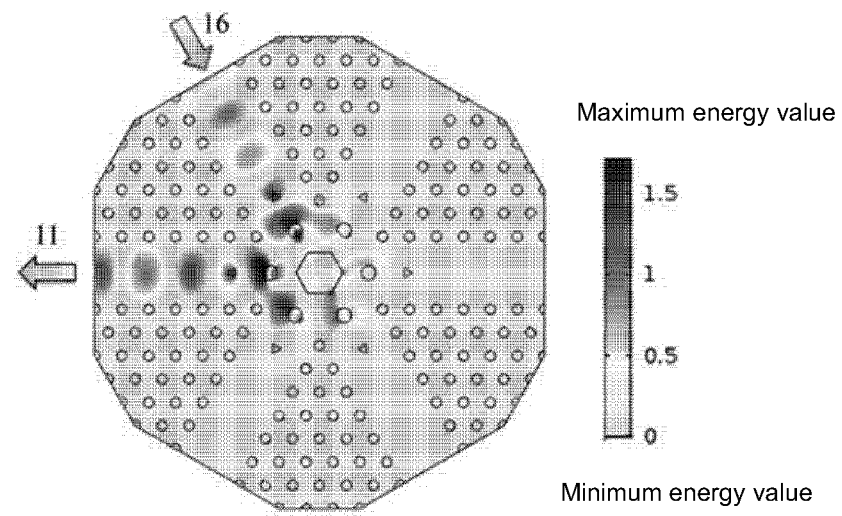
FIG. 8 is a sixth-case light transmission diagram of a six-port PhC magneto-optical circulator according to an embodiment of the present invention.

Referring to FIG. 8 of the drawings, the frequency of the electromagnetic wave is chosen to within 10.68 GHz to 10.72 GHz. For example, electromagnetic wave with the frequency of 10.70 GHz is incident from the sixth waveguide port 16. The electromagnetic wave is rotated by the angle of 60° by the magneto-optical material column F and A successively, and finally the electromagnetic wave is outputted from the first waveguide port 11 and the insertion loss of the first waveguide port 11 is 0.112 dB. In this case, the second dielectric material column 02 of the PhC causes an efficient coupling of the magneto-optical material columns F and A. The third dielectric material columns 03 on the periphery of the magneto-optical material column F has an effect of improving match between the magneto-optical material column F and the corresponding waveguide thereof. The third dielectric material columns 03 on the periphery of the magneto-optical material column A has an effect of improving match between the magneto-optical material column A and the corresponding waveguide thereof, therefore the transmission efficiency from the sixth waveguide port 16 to the first waveguide port 11 is improved. The second waveguide port 12, the third waveguide port 13, the fourth waveguide port 14 and the fifth waveguide port 15 are in the light isolation state and the isolation degrees respectively are 23.78 dB, 27.42 dB, 24.17 dB and 20.69 dB. In this case, the magneto-optical material column B has an effect of isolating the second waveguide port 12. The magneto-optical material column C has an effect of isolating the third waveguide port 13. The magneto-optical material column D has an effect of isolating the fourth waveguide port 14. The magneto-optical material column E has an effect of isolating the fifth waveguide port 15.

The PhC magneto-optical circulator forms unidirectional circular transmission. In other words, the electromagnetic wave signal inputted from any one of the waveguide ports is outputted from the next waveguide port adjacent thereto, while the remaining waveguide ports are in a signal isolated state.

The PhC magneto-optical circulator of the present invention is not limited to the above embodiments. It shall be understood that one skilled in the art is subject to select the appropriate materials according to the disclosed technology of the present invention and according to the proportional scaling principle of the PhC, such as the operating wavelength of the circulator is in proportional relationship with the parameters such as PhC PhC, the size of the first dielectric material columns, the second dielectric material column and the third dielectric material columns, and the size of the magneto-optical material column.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A compact six-port photonic crystal (PhC) circulator, wherein a main body of said six-port PhC circulator is a two-dimensional (2D) hexagonal photonic crystal waveguide (PCW) in a low-refractive-index background dielectric material, said hexagonal PCW is formed by first dielectric material columns which are arranged in the forms of 2D triangular lattices, wherein said six-port PhC circulator comprises:

six PhC branch waveguides and six waveguide ports; wherein said six PhC branch waveguides are arranged at a cross-connected position in the center and having a 60 degree rotational symmetry distribution, said six PhC branch waveguides respectively correspond to said six waveguide ports, and said six waveguide ports are symmetrically distributed at the periphery of said PhC, respectively; the central axis of the six PhC branch waveguides are located respectively along a negative direction with respect to the horizontal axis, in an angle of 240 degree with respect to the horizontal axis, in an angle of 300 degree with respect to the horizontal axis, in a positive direction with respect to the horizontal axis, in an 60 degree with respect to the horizontal axis, and in an angle of 120 degree with respect to the horizontal axis; a second dielectric material column is arranged at the center of said six PhC branch waveguides and first adjacent position of said second dielectric material column, wherein six identical magneto-optical material columns are arranged respectively along the center axis of the six PhC branch waveguides; at second adjacent positions of said second dielectric material column, six identical third dielectric material columns are arranged respectively along the center axis of the six PhC branch waveguides, a shape of the cross-section of said third dielectric material columns is equilateral triangle or circular, the center point and a vertex of said equilateral triangle are located on the center axis of said corresponding branch waveguides, and the vertex of the equilateral triangle corresponds to the waveguide port direction; and an electromagnetic wave signal inputted from any one of the waveguide ports and is outputted from the next waveguide port adjacent thereto, while the remaining waveguide ports are in a signal isolated state, thus forming circular transmission in single rotational direction among six ports.

2. The compact six-port PhC circulator of claim 1, wherein said low-refractive-index background dielectric material is a dielectric material having a refractive index of less than 1.5.

3. The compact six-port PhC circulator of claim 1, wherein said low-refractive-index background dielectric material is air, vacuum, or foam.

4. The compact six-port PhC circulator of claim 1, wherein said first dielectric material columns are dielectric material having a refractive index of more than 2.

5. The compact six-port PhC circulator of claim 1, wherein a shape of the cross-section of said first dielectric material columns is circular, or regular polygon.

6. The compact six-port PhC circulator of claim 5, wherein a shape of the cross-section of said first dielectric material columns is circular.

7. The compact six-port PhC circulator of claim 1, wherein said first dielectric material columns are silicon, gallium arsenide, titanium dioxide, or gallium nitride.

8. The compact six-port PhC circulator of claim 1, wherein a width of each of said branch waveguides is 3a and a length of each of said six PhC branch waveguides is na, where a is the lattice constant of the PhC and n is an integer no less than 4.

9. The compact six-port PhC circulator of claim 1, wherein said second dielectric material column is a dielectric material having a refractive index of more than 2.

10. The compact six-port PhC circulator of claim 1, wherein a shape of the cross-section of said second dielectric material column is regular hexagon, or circular.

11. The compact six-port PhC circulator of claim 1, wherein a shape of the cross-section of said second dielectric material column is regular hexagon and the six top points of said regular hexagon are located on the corresponding center axis of said six PhC branch waveguides, respectively.

12. The compact six-port PhC circulator of claim 1, wherein said second dielectric material column is silicon, gallium arsenide, titanium dioxide, or gallium nitride.

13. The compact six-port PhC circulator of claim 1, wherein a distance between the center of said second dielectric material column and the center of said six magneto-optical material columns is 1.8a, where a is the lattice constant of the PhC.

14. The compact six-port PhC circulator of claim 1, wherein said magneto-optical material columns are made of ferrite material.

15. The compact six-port PhC circulator of claim 1, wherein a shape of the cross-sections of said magneto-optical material columns are circular or regular polygon.

16. The compact six-port PhC circulator of claim 15, wherein a shape of the cross-sections of said magneto-optical material columns are circular.

17. The compact six-port PhC circulator in claim 1, wherein said third dielectric material columns are dielectric material having a refractive index of more than 2.

18. The compact six-port PhC circulator of claim 1, wherein a shape of the cross-section of said third dielectric material columns is equilateral triangle.

19. The compact six-port PhC circulator of claim 1, wherein said third dielectric material columns are silicon, gallium arsenide, titanium dioxide, or gallium nitride.

20. The compact six-port PhC circulator of claim 1, wherein a distance between each of the center of said third dielectric material columns and the center of said second dielectric material column is 3.2a, where a is the lattice constant of the PhC.

* * * * *